United States Patent
Kothari et al.

(10) Patent No.: US 8,214,120 B2
(45) Date of Patent: Jul. 3, 2012

(54) METHOD TO MANAGE A HIGH VOLTAGE SYSTEM IN A HYBRID POWERTRAIN SYSTEM

(75) Inventors: Aniket Kothari, Southfield, MI (US); Nicholas Kokotovich, Troy, MI (US); Stephen T. West, New Palestine, IN (US); James E. Tarchinski, Rochester Hills, MI (US); Sean E Gleason, West Bloomfield, MI (US); William R. Cawthorne, Milford, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 834 days.

(21) Appl. No.: 12/259,318

(22) Filed: Oct. 28, 2008

(65) Prior Publication Data

US 2009/0118916 A1 May 7, 2009

Related U.S. Application Data

(60) Provisional application No. 60/985,277, filed on Nov. 4, 2007.

(51) Int. Cl.
*G06F 7/70* (2006.01)
*G05D 1/00* (2006.01)
*B60K 6/20* (2007.10)

(52) U.S. Cl. .......................... 701/70; 701/84; 180/65.21

(58) Field of Classification Search ................. 701/22, 701/35, 208, 211, 213, 300, 84, 70, 53; 180/65.21, 180/65.1–65.8; 340/995.1, 995.19
See application file for complete search history.

(56) References Cited

U.S. PATENT DOCUMENTS

| | | |
|---|---|---|
| 6,832,148 B1 | 12/2004 | Bennett |
| 6,868,318 B1 | 3/2005 | Cawthorne |
| 7,154,236 B1 | 12/2006 | Heap |
| 2002/0149954 A1 * | 10/2002 | Besnier et al. ............... 363/123 |
| 2004/0158365 A1 | 8/2004 | Tabata et al. |
| 2005/0076958 A1 | 4/2005 | Foster |
| 2005/0077867 A1 | 4/2005 | Cawthorne |
| 2005/0077877 A1 | 4/2005 | Cawthorne |
| 2005/0080523 A1 | 4/2005 | Bennett |
| 2005/0080527 A1 | 4/2005 | Tao |
| 2005/0080535 A1 | 4/2005 | Steinmetz |
| 2005/0080537 A1 | 4/2005 | Cawthorne |
| 2005/0080538 A1 | 4/2005 | Hubbard |
| 2005/0080539 A1 | 4/2005 | Hubbard |
| 2005/0080540 A1 | 4/2005 | Steinmetz |
| 2005/0080541 A1 | 4/2005 | Sah |
| 2005/0182526 A1 | 8/2005 | Hubbard |

(Continued)

FOREIGN PATENT DOCUMENTS

CN 1528612 A 9/2004

(Continued)

*Primary Examiner* — James Trammell
*Assistant Examiner* — Muhammad Shafi

(57) ABSTRACT

A powertrain includes an electromechanical transmission operative to transmit torque between an input member and an electric machine and an output member to transmit tractive torque. The electric machine is electrically connected to an inverter device which is electrically connected to an energy storage device. A method for operating the powertrain includes detecting a shutdown event, commanding the transmission to neutral, commanding the electric machine to cease operating in a torque generating mode, and electrically disconnecting the energy storage device from the inverter device.

17 Claims, 6 Drawing Sheets

U.S. PATENT DOCUMENTS

| | | |
|---|---|---|
| 2005/0182543 A1 | 8/2005 | Sah |
| 2005/0182546 A1 | 8/2005 | Hsieh |
| 2005/0182547 A1 | 8/2005 | Sah |
| 2005/0189918 A1 | 9/2005 | Weisgerber |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0087893 A1 | 4/2007 | Tabata et al. |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2007/0298767 A1* | 12/2007 | Brown et al. ........ 455/411 |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Aettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West et al. |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Hsieh |
| 2009/0118925 A1 | 5/2009 | Hsieh |

| | | | | | | |
|---|---|---|---|---|---|---|
| 2009/0118926 A1 | 5/2009 | Heap | | 2009/0118948 A1 | 5/2009 | Heap |
| 2009/0118927 A1 | 5/2009 | Heap | | 2009/0118949 A1 | 5/2009 | Heap |
| 2009/0118928 A1 | 5/2009 | Heap | | 2009/0118950 A1 | 5/2009 | Heap |
| 2009/0118929 A1 | 5/2009 | Heap | | 2009/0118951 A1 | 5/2009 | Heap |
| 2009/0118930 A1 | 5/2009 | Heap | | 2009/0118952 A1 | 5/2009 | Heap |
| 2009/0118931 A1 | 5/2009 | Kaminsky | | 2009/0118954 A1 | 5/2009 | Wu |
| 2009/0118932 A1 | 5/2009 | Heap | | 2009/0118957 A1 | 5/2009 | Heap |
| 2009/0118933 A1 | 5/2009 | Heap | | 2009/0118962 A1 | 5/2009 | Heap |
| 2009/0118934 A1 | 5/2009 | Heap | | 2009/0118963 A1 | 5/2009 | Heap |
| 2009/0118935 A1 | 5/2009 | Heap | | 2009/0118964 A1 | 5/2009 | Snyder |
| 2009/0118936 A1 | 5/2009 | Heap | | 2009/0118969 A1 | 5/2009 | Heap |
| 2009/0118937 A1 | 5/2009 | Heap | | 2009/0118971 A1 | 5/2009 | Heap |
| 2009/0118938 A1 | 5/2009 | Heap | | 2009/0118999 A1 | 5/2009 | Heap |
| 2009/0118939 A1 | 5/2009 | Heap | | 2009/0144002 A1 | 6/2009 | Zettel |
| 2009/0118940 A1 | 5/2009 | Heap | | 2010/0151988 A1 * | 6/2010 | Tabata et al. .................. 477/3 |
| 2009/0118941 A1 | 5/2009 | Heap | | | | |
| 2009/0118942 A1 | 5/2009 | Hsieh | | | | |
| 2009/0118943 A1 | 5/2009 | Heap | | | | |
| 2009/0118944 A1 | 5/2009 | Heap | | | | |
| 2009/0118945 A1 | 5/2009 | Heap | | | | |
| 2009/0118946 A1 | 5/2009 | Heap | | | | |
| 2009/0118947 A1 | 5/2009 | Heap | | | | |

FOREIGN PATENT DOCUMENTS

| | | |
|---|---|---|
| EP | 1 260 397 A2 | 11/2002 |
| JP | 2007 001491 A | 1/2007 |
| WO | WO-2006-137591 * | 12/2006 |

* cited by examiner

METHOD TO MANAGE A HIGH VOLTAGE SYSTEM IN A HYBRID POWERTRAIN SYSTEM

CROSS REFERENCE TO RELATED APPLICATIONS

This application claims the benefit of U.S. Provisional Application No. 60/985,277 filed on Nov. 4, 2007 which is hereby incorporated herein by reference.

TECHNICAL FIELD

This disclosure pertains to control systems for hybrid powertrain systems.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electromechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A powertrain includes an electromechanical transmission operative to transmit torque between an input member and an electric machine and an output member to transmit tractive torque. The electric machine is electrically connected to an inverter device which is electrically connected to an energy storage device. A method for operating the powertrain includes detecting a shutdown event, commanding the transmission to neutral, commanding the electric machine to cease operating in a torque generating mode, and electrically disconnecting the energy storage device from the inverter device.

BRIEF DESCRIPTION OF THE DRAWINGS

One or more embodiments will now be described, by way of example, with reference to the accompanying drawings, in which.

DETAILED DESCRIPTION

Figure 1:
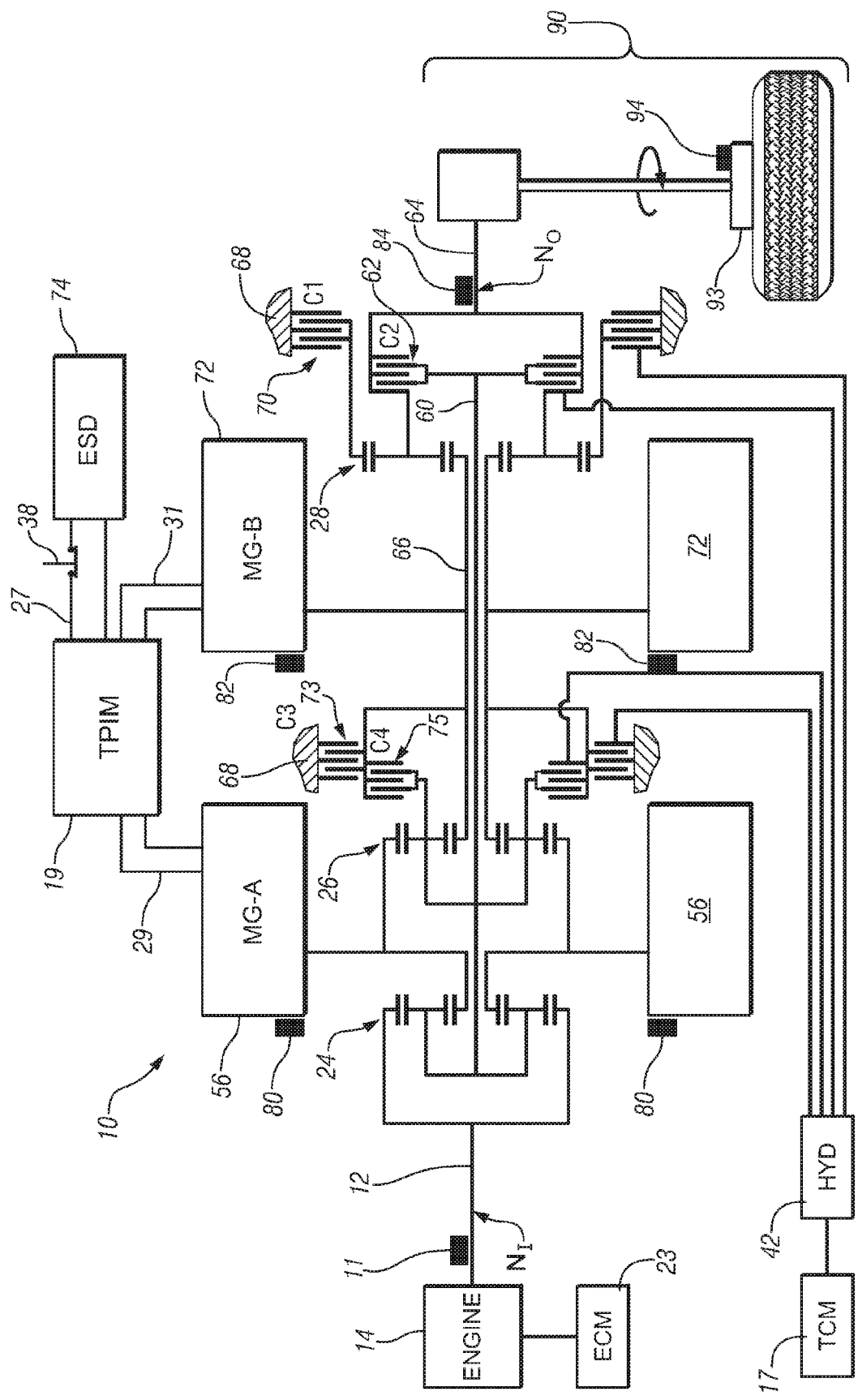
FIG. 1 is a schematic diagram of an exemplary powertrain, in accordance with the present disclosure.
Figure 2:
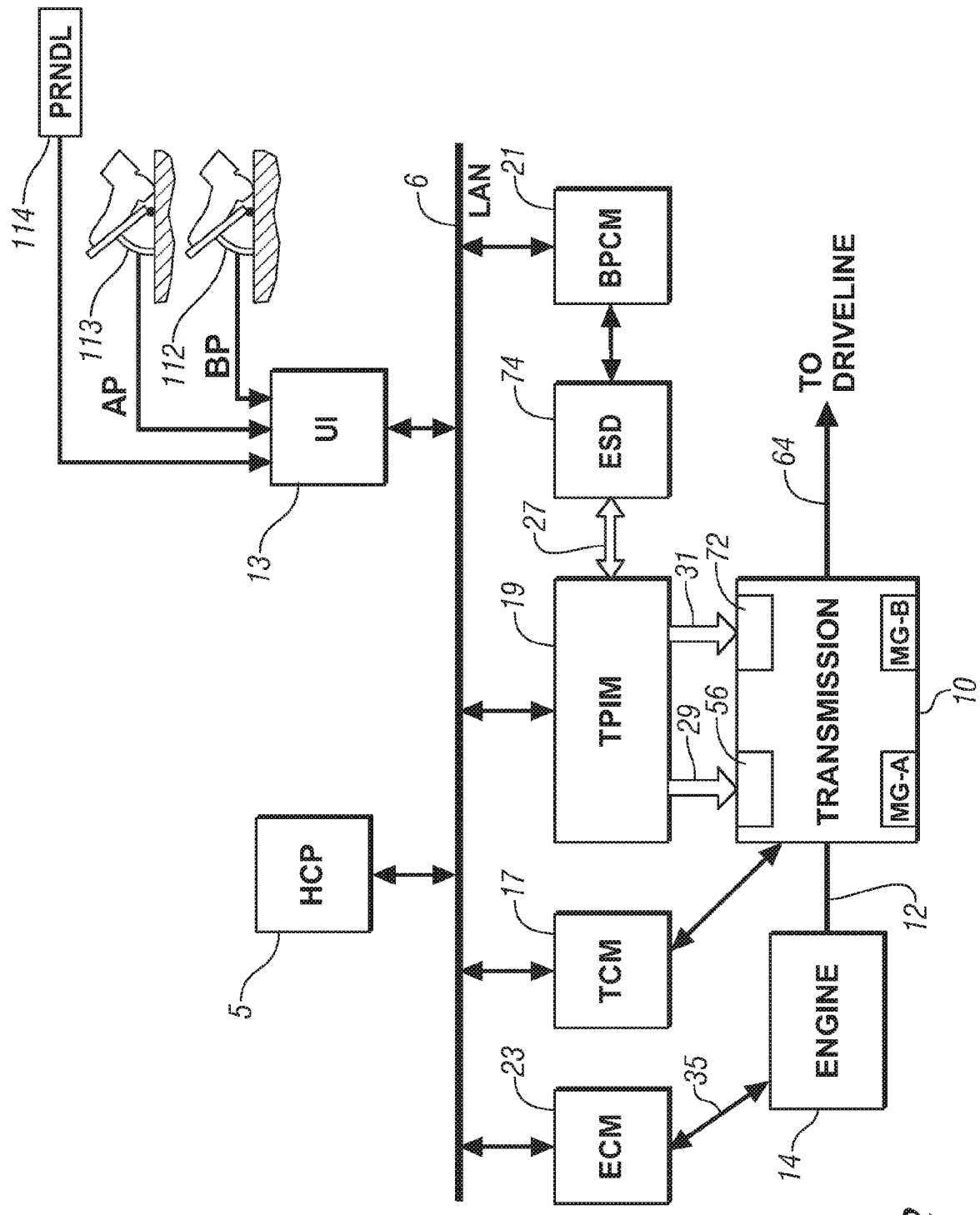
FIG. 2 is a schematic diagram of an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary hybrid powertrain. The exemplary hybrid powertrain in accordance with the present disclosure is depicted in FIG. 1, comprising a two-mode, compound-split, electromechanical hybrid transmission 10 operatively connected to an engine 14 and torque machines comprising first and second electric machines ('MG-A') 56 and ('MG-B') 72. The engine 14 and the first and second electric machines 56 and 72 each generate power which can be transferred to the transmission 10. The power generated by the engine 14 and the first and second electric machines 56 and 72 and transferred to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transfer torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and engine torque, can differ from the input speed $N_I$ and the input torque $T_I$ to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The transmission 10 includes an output member 64, e.g. a shaft, which is operably connected to a driveline 90 for a vehicle (not shown), to provide output power to the driveline 90 that is transferred to vehicle wheels 93, one of which is shown in FIG. 1. The output power at the output member 64 is characterized in terms of an output rotational speed $N_O$ and an output torque $T_O$. A transmission output speed sensor 84 monitors rotational speed and rotational direction of the output member 64. Each of the vehicle wheels 93 is preferably equipped with a sensor 94 adapted to monitor wheel speed, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to a transmission power inverter control module (hereafter 'TPIM') 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31 to meet the torque commands for the first and second electric machines 56 and 72 in response to the motor torques $T_A$ and $T_B$. Electrical current is transmitted to and from the ESD 74 in accordance with whether the ESD 74 is being charged or discharged. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary hybrid powertrain described in FIG. 1. The distributed control module system synthesizes pertinent information and inputs, and executes algorithms to control various actuators to meet control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electromechanical hybrid powertrain. The devices include an accelerator pedal 113 ('AP'), an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the hybrid powertrain, serving to coordinate operation of the ECM 23, TCM 17, TPIM 19, and BPCM 21. Based upon various input signals from the user interface 13 and the hybrid powertrain, including the ESD 74, the HCP 5 determines an operator torque request, an output torque command, an engine input torque command, clutch torque(s) for the applied torque-transfer clutches C1 70, C2 62, C3 73, C4 75 of the transmission 10, and the motor torques $T_A$ and $T_B$ for the first and second electric machines 56 and 72. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicating parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

A brake control module (hereafter 'BrCM') 22 is operatively connected to friction brakes (not shown) on each of the vehicle wheels 93. The BrCM 22 monitors the operator input to the brake pedal 112 and generates control signals to control the friction brakes and sends a control signal to the HCP 5 to operate the first and second electric machines 56 and 72 based thereon.

Each of the control modules ECM 23, TCM 17, TPIM 19, BPCM 21, and BrCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several operating range states that can be described in terms of an engine state comprising one of an engine-on state ('ON') and an engine-off state ('OFF'), and a transmission state comprising a plurality of fixed gears and continuously variable operating modes, described with reference to Table 1, below.

TABLE 1

| Description | Engine State | Transmission Operating Range State | Applied Clutches | |
| --- | --- | --- | --- | --- |
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. When the engine is in neutral, none of the clutches are applied and the engine 14 rotates independently of the transmission 10. A fixed gear operation provides a fixed ratio operation of input-to-output speed of the transmission 10, i.e., $N_I/N_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine torque commands to control the torque generative devices comprising the engine 14 and first and second electric machines 56 and 72 to meet the operator torque request at the output member 64 and transferred to the driveline 90. Based upon input signals from the user interface 13 and the hybrid powertrain including the ESD 74, the HCP 5 determines the operator torque request, a commanded output torque from the transmission 10 to the driveline 90, an input torque from the engine 14, clutch torques for the torque-transfer clutches C1 70, C2 62, C3 73, C4 75 of the transmission 10; and the motor torques for the first and second electric machines 56 and 72, respectively, as is described hereinbelow.

Final vehicle acceleration can be affected by other factors including, e.g., road load, road grade, and vehicle mass. The operating range state is determined for the transmission 10 based upon a variety of operating characteristics of the hybrid powertrain. This includes the operator torque request communicated through the accelerator pedal 113 and brake pedal 112 to the user interface 13 as previously described. The operating range state may be predicated on a hybrid powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required in response to the desired output torque at output member 64 to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electromechanical transmission 10 are mechanically-operatively coupled to transfer power therebetween to generate a power flow to the output member 64.

Figure 3:
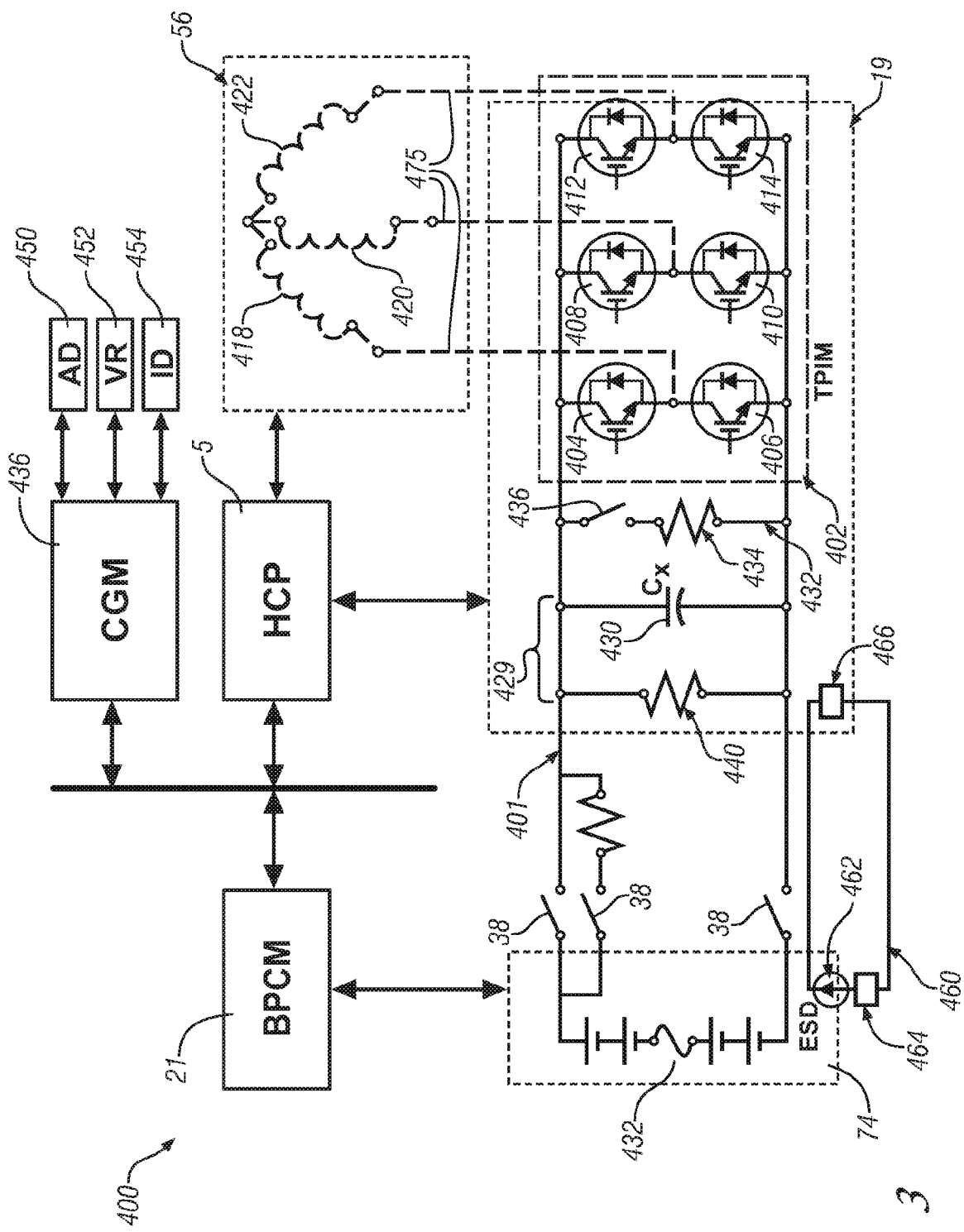
FIG. 3 is a schematic diagram of a circuit of the powertrain of FIG. 2, in accordance with the present disclosure.

FIG. 3 shows the system in greater detail. The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core. The stator core of the first electric machine 56 further includes inductors 418, 420, and 422. Each inductor 418, 420, and 422 comprise coiled electrical windings extending from the stator core of the first electric machine 56. Further, the stator core of the second electric 72 machine includes inductors (not shown) comprising electrical coil windings extending from the stator core of the first electric machine 56. Each inductor 418, 420, and 422 operates utilizing a different phase of AC power supplied by first power inverter circuit 402 for converting electric power during motoring or generating operation of the electric machine 56. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to the TPIM 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

FIG. 3 shows a high voltage monitoring and control circuit 400 for monitoring and controlling a high voltage circuit 401 of the powertrain to effect shutdown of the exemplary powertrain system described with reference to FIG. 1 and FIG. 2. The high voltage monitoring and control circuit 400 includes the high voltage circuit 401, the HCP 5, an airbag deployment sensor 450, a vehicle roll sensor 452, an inertia detection sensor 454, a communications gateway module (hereafter, 'CGM') 456 and a high voltage interlock circuit 460. The high voltage circuit 401 includes the ESD 74, the contactors 38, the TPIM 19, and the first electric machine 56.

Although the high voltage monitoring control circuit 400 is described herein, it to be understood that a high voltage monitoring control circuit (not shown) having a substantially similar structure to the high voltage monitoring control circuit 400 monitors voltage with respect a high voltage circuit (not shown) comprising the second electrical machine 72.

The ESD 74 includes a high voltage battery 432. In one embodiment, the voltage output from the high voltage battery 432 is nominally in the range of 300 volts, however, in other embodiments batteries having other voltage levels can be used.

The TPIM 19 includes a first power inverter circuit 402, a second power inverter circuit (not shown), a capacitive circuit 429, and an active discharge circuit 432. The first power inverter circuit 402 and the second power inverter circuit comprise three-phase power electronics devices configured to receive the torque commands and control inverter states therefrom for providing motor drive or regeneration functionality to achieve the input torques $T_A$ and $T_B$.

The first power inverter circuit 402 includes a plurality of insulated gate bipolar transistors (hereafter 'IGBTs') 404, 406, 408, 410, 412, and 414. The operation of the IGBT 404, the IGBT 406, the IGBT 408, the IGBT 410, the IGBT 412, and the IGBT 414 is controlled pairs to provide AC current for each phase the three phases of the first electric machine 56. The IGBT 404 operates with the IGBT 406 to provide a first phase, the IGBT 408 operates with the IGBT 410 to provide a second phase, and the IGBT 412 operates with the IGBT 414 to provide a third phase.

The IGBTs 404, 406, 408, 410, 412, and 414 of the first inverter circuit 402 form a switch mode power supply configured to receive control commands to convert between DC power and AC power for powering the first electric machine 56 by switching at high frequencies. States of the IGBTs 404, 406, 408, 410, 412, and 414 are controlled to convert electric power by providing motor drive mechanical power generation or electric power regeneration functionality through the first electric machine 56.

The active discharge circuit 432 includes a resistor 434 and a switch 436. The switch 436 is controlled by the TPIM 19 and is controlled to a default open position. The switch 436 provides selective electrical communication between the active circuit 432 and the capacitive circuit 429. The resistor 434 provides a resistance to actively discharge capacitive electrical potential. In one embodiment, the resistor 434 is a 50 ohm resistor.

The capacitive circuit 429 includes a capacitor 430 and a second resistor 440. The resistor 440 provides a resistance to passively discharge the capacitive electrical potential. In an exemplary embodiment, the resistor 440 is a 75 kilohm resistor and the capacitor 430 is a 1000 microfarad capacitor. In one embodiment the capacitive circuit 429 includes the capacitor 430, and in alternate embodiments the capacitive circuit can include capacitors having different capacitive loads.

The airbag deployment sensor 450 is disposed proximate to an airbag (not shown) of the vehicle and senses whether the airbag of the vehicle is in a deployed position. The airbag deployment sensor 450 signally communicates with the CGM 456. When the CGM 456 receives a signal from the airbag deployment sensor 450 indicating detection of the airbag in a deployed position the CGM 456 sends a signal indicating airbag deployment to the HCP 5 via the LAN bus 6.

The vehicle roll sensor 452 is disposed within a chassis (not shown) of the vehicle. The vehicle roll sensor 452 detects whether vehicle roll is greater than a threshold roll level. The vehicle roll sensor 452 signally communicates with the CGM 456. When the CGM 456 receives a signal from the vehicle roll sensor 452 indicating detection of vehicle roll greater than the threshold roll level, the CGM 456 sends a signal indicating vehicle roll greater than the threshold roll level to the HCP 5 via the LAN bus 6.

The inertia detection sensor 454 is disposed within the chassis of the vehicle and the inertia detection sensor 454 detects a change in vehicle inertia exceeding a threshold inertia level. The inertia detection sensor 454 signally communicates with the CGM 456. When the CGM 456 receives a signal from the inertia detection sensor 454 indicating detection of a change in vehicle inertia greater than the threshold inertia level, the CGM 456 sends a signal indicating vehicle inertia greater than the threshold to the HCP 5.

In other embodiments, the airbag deployment sensor 450, the vehicle roll sensor 452, and the inertia detection sensor 454 have redundant communications paths to the HCP 5. In other embodiments, the airbag deployment sensor 450, the vehicle roll sensor 452, and the inertia detection sensor 454 send signals to one or more other control modules (not shown) in addition to the CGM 456. In other embodiments, the other control modules communicate through with the HCP 5 via communication busses (not shown) other than the LAN bus 6.

The high voltage interlock circuit 460 includes a current source 462 supplied by a low voltage bus (not shown), a first current sensor 464 for monitoring high voltage interlock circuit current proximate the ESD 74, and a second current sensor 466 for monitoring high voltage interlock circuit current proximate the TPIM 19. The high voltage interlock circuit 460 is connected to access points of the TPIM 19 and the ESD 74 to detect access to internal components such as, opening of casing component (not shown) of the TPIM 19 or opening of casing components (not shown) of the ESD 74. When internal components of the TPIM 19 and the ESD 74 are accessed the high voltage interlock circuit 460 is opened and current supply across the high voltage interlock circuit drops to zero. The first current sensor 464 is interfaced with the BPCM 21, which sends signals indicating high voltage interlock circuit current to the HCP 5 through the LAN bus 6. The second current sensor 466 interfaces with the TPIM 19 and the TPIM 19 sends signals indicating high voltage interlock circuit current to the HCP 5 through the LAN bus 6.

Figure 4:
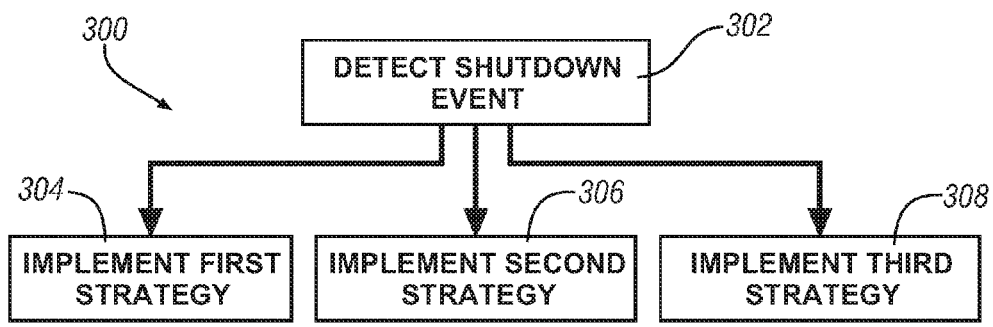
FIG. 4 is a flow chart of an exemplary method for shutting down a powertrain, in accordance with the present disclosure.

FIG. 4 shows a method 300 for managing high voltage electrical potential in a powertrain to effect shutdown of the exemplary powertrain system described with reference to FIG. 1 and FIG. 2. The HCP 5 detects a powertrain shutdown event (302). In response, to the powertrain shutdown event, the HCP 5 commands the powertrain to operate in a non-propulsion, energy conservation operating state. In the exemplary embodiment, the HCP 5 either detects the shutdown event by detecting one of a operator-initiated shutdown event, a fault-initiated shutdown event, or an externally-initiated shutdown event.

The operator-initiated shutdown event comprises an operator commanding an off state of the vehicle, which can be initiated by the operator turning a key to an off position or pressing an off button, thereby sending a signal to the HCP 5 via the LAN bus 6.

The fault-initiated shutdown event includes a shutdown event that is detected when the HCP 5 receives a signal indicating a fault in the powertrain necessitating shutdown of the powertrain. In one embodiment, the HCP 5 and other control modules continuously monitor states of the operating parameters and the actuator command signals of the powertrain components such as voltage levels, current levels, power levels, and temperature levels. The HCP 5 and other control modules perform validity and rationality tests by comparing measurements to predetermined values or to values based on vehicle operating conditions. In one embodiment, the HCP 5 sends the signal indicating the fault when detecting a temperature above a threshold temperature, a voltage level outside a predetermined voltage range, or a current level outside a predetermined current range.

The externally-initiated shutdown event includes a shutdown event initiated from a sensor monitoring vehicle conditions external to the powertrain. The externally-initiated event can include an airbag deployment, a vehicle roll level greater than a threshold roll level, and a change in vehicle inertia greater than a threshold inertia level. The airbag deployment sensor 450 detects airbag deployment and the HCP 5 receives a signal indicating the airbag deployment via the LAN bus 6. The vehicle roll sensor 452 detects vehicle roll level greater than a threshold roll level, and the HCP 5 receives a signal indicating vehicle roll exceeding a threshold vehicle roll level via the LAN bus 6. The inertia detection sensor 454 detects changes in inertia level greater than a threshold inertia level and the HCP 5 receives a signal indicating the inertia level than a threshold inertia level via the LAN bus 6.

In the exemplary embodiment, the HCP 5 initiates one of three high voltage management strategies based upon the type of shutdown event detected by the HCP 5. The high voltage management strategies are associated with different speeds at which the high voltage battery 432 can be isolated from the high voltage circuit 401. In particular, the HCP 5 either initiates a first high voltage management strategy 304, a second high voltage management strategy 306, or a third high voltage management strategy 308. The first high voltage management strategy 304 is associated with the slowest battery isolation speed, the second high voltage management strategy 306 is associated with an intermediate battery isolation speed and the third high voltage management strategy 308 is associated with fastest battery isolation speed for isolating the high voltage battery 432 from the high voltage circuit 301.

If the HCP 5 receives signals indicating shutdown events associated with multiple high voltage management strategies, the HCP 5 will preferentially select the shutdown strategy associated with the fastest discharge speed. Therefore, the HCP 5 will utilize the third high voltage management strategy 308 over both the second high voltage management strategy 306 and the first high voltage management strategy 304, and the HCP 5 will preferentially select the second first high voltage management strategy 306 over the first high voltage management strategy 304.

Although three high voltage management strategies are described, each being associated with different battery isolation speeds, other embodiments can utilize other numbers of high voltage management strategies. For example, in other embodiments, two high voltage management strategies and more than three different high voltage management strategies can be utilized.

When the HCP 5 receives a signal indicating an operator-initiated shutdown event, the HCP 5 initiates the first high voltage management strategy 304. When the HCP 5 receives a signal indicating a fault-initiated shutdown event, the HCP 5 initiates the second high voltage management strategy 306. When the HCP 5 receives a signal indicating an externally-initiated shutdown event, the HCP 5 initiates the third high voltage management strategy 308. In alternative embodiments, other types of sensors and other signals can be used to detect vehicle situations in which selecting different high voltage management strategies are desirable.

Figure 5:
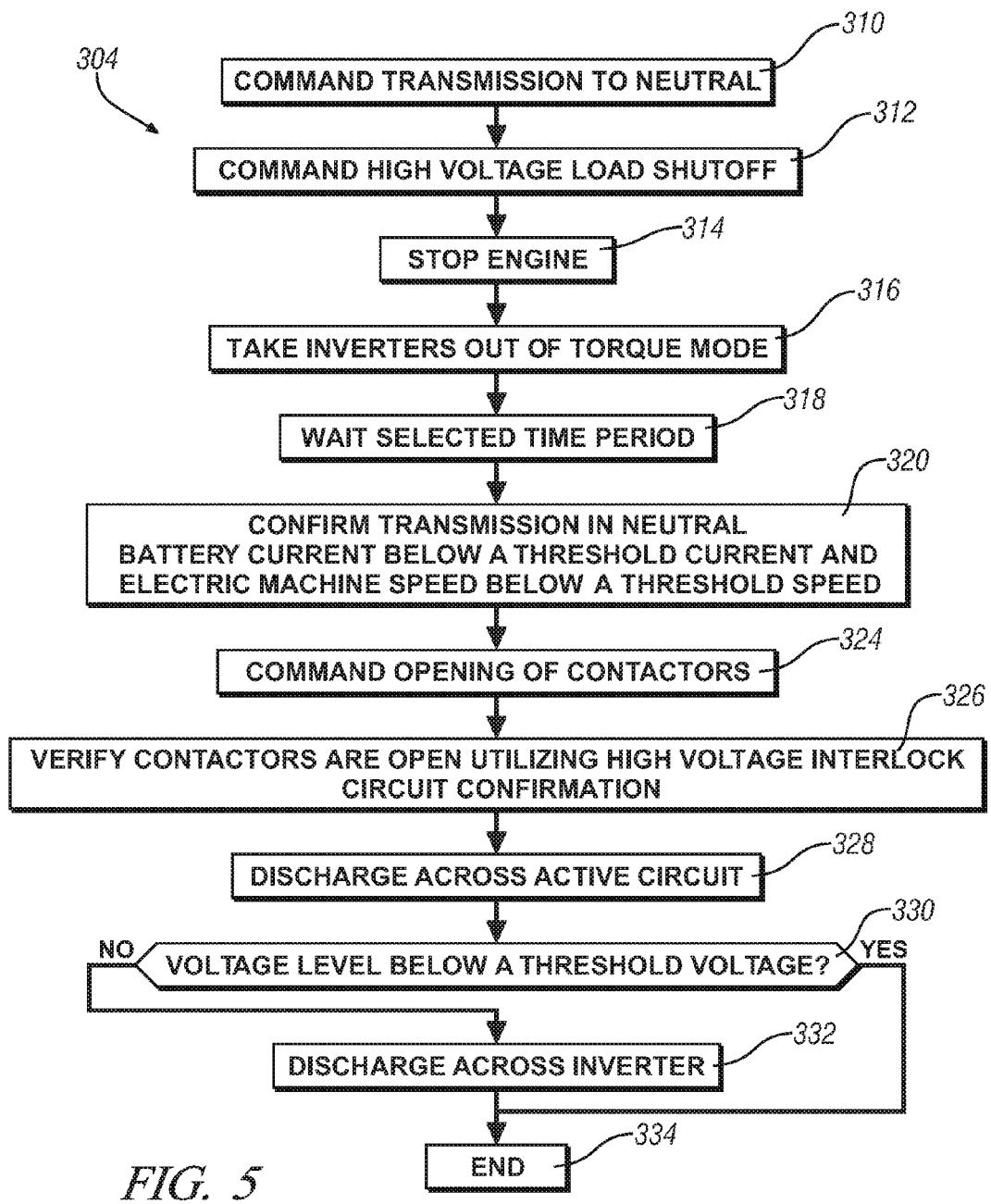
FIG. 5 is a flow chart of an exemplary standard shutdown procedure, in accordance with the present disclosure.

FIG. 5 shows the first high voltage management strategy 304 when the operator-initiated shutdown event is detected. The HCP 5 commands the transmission 10 to neutral (310). The HCP 5 commands auxiliary high voltage loads (not shown) to shutoff (312). The auxiliary high voltage loads that are commanded to shutoff include an air-conditioning compressor (not shown), and a voltage conversion device (not shown). The HCP 5 commands fuel injectors (not shown) to discontinue fueling the engine 14 (314). The HCP 5 then receives a signal from the ECM 23 indicating rotational speed of the engine 14 via the LAN bus 6. The HCP 5 proceeds to step 316 either after the rotational speed of the engine 15 is below a selected speed or a predetermined time period elapses. The HCP 5 commands the TPIM 19 to cease torque mode operation (316). In one embodiment, the TPIM 19 commands the phasing of alternating current to the inductors 418, 420, 422 of the first electric machine 56, such that the first electric machine 56 produces approximately zero torque when converting electric power. Further, the TPIM 19 commands phasing of alternating current to the inductors (not shown) of the second electric machine 72 such that the second electric machine 72 produces approximately zero torque when converting electric power. The HCP 5 confirms that the TPIM 19 has discontinued torque mode by receiving a confirmation signal from the TPIM 19. The HCP 5 proceeds to step 218 after the confirmation signal is received or after a selected time period elapses.

The HCP 5 allows a selected amount of time to elapse such as to reduce speed and power of the engine 14, and the first and second electric machines 56 and 72, and to allow current to dissipate through resistances in the high voltage circuit 401 (318). In one embodiment, the selected amount of time is 10 seconds. The HCP 5 confirms that the transmission 10 is in neutral, the battery current is below a threshold current, and that the electric machine speeds are below a threshold speed (320). The HCP 5 confirms that the transmission 10 is in neutral by receiving signals indicating valve states and solenoid commands from a control module (not shown) through the LAN bus 6. The HCP 5 confirms that the high voltage battery current is below a threshold current level by receiving a signal indicating the high voltage battery current from the BPCM 21 via the LAN 6. The HCP 5 then compares the high voltage battery current to a stored value for a high voltage battery threshold current. In an exemplary embodiment, the high voltage battery threshold current for the first high voltage management strategy 304 is 18 Amperes.

The HCP 5 confirms that the rotational speed of the first and second electric machines 56 and 72 is below a threshold rotational speed level. In one embodiment, the HCP 5 receives a signal indicating the rotational speed of the resolvers of the first and second electric machines 56 and 72 from the TPIM 19. In one embodiment, the rotational speed threshold for the first high voltage management strategy 304 is 20 revolutions per minute. If the HCP 5 receives signals indicating that the transmission 10 is in neutral, the battery current is below a threshold current, and each of the rotational speeds of the first and second electric machine 56 and 72 are below the threshold rotational speed level, the HCP 5 proceeds to step 324. Otherwise, the HCP 5 waits a selected time period before proceeding to step 324.

The HCP 5 sends a signal to the BPCM 21 to command contactors 38 from a closed position to an open position (324). When the BPCM 21 commands the contactors to the open position, the BPCM 21 sends a confirmation signal indicating the contactor position to the HCP 5 via the LAN 6. The HCP 5 waits to receive the confirmation signal from the BPCM 21 prior to proceeding to step 328. The HCP 5 verifies that the contactors 38 are open utilizing a current level measurement across the high voltage interlock circuit 460 (326). The BPCM 21 sends the current level measurements of the first current sensor 464 to the HCP 5 via the LAN bus 6. The BPCM 21 sends the current level measurements of the second current sensor 466 to the HCP 5 via the LAN bus 6. The HCP 5 waits to receive a current measurement from the first current sensor 464 below a threshold current level and a current measurement from the second current sensor 466 below a threshold current level prior to proceeding to step 328.

The HCP 5 commands the TPIM 19 to actuate the switch 436 from an open position, to a closed position to electrically couple the active circuit 432 to the capacitive circuit 429 (329) such that power from the capacitive circuit can be dissipated through the resistor 434 of the active circuit 432.

The TPIM 19 measures a voltage across the capacitive circuit 429 after a selected time period elapses (330). In an exemplary embodiment, the selected time period is 50 milliseconds. The HCP 5 receives the voltage measurement from the TPIM 19 and compares the voltage measurement across the capacitive circuit 429 to a threshold voltage level. If after the selected time period elapses, the voltage measurement across the capacitive circuit is greater than the threshold voltage, the method proceeds to step 332. If after the selected time period elapses, the voltage measurement across the capacitive circuit 429 is less than the threshold voltage, the HCP 5 proceeds to END step 334.

The HCP 5 commands discharge across the inverter circuit (332). In an exemplary embodiment, the HCP 5 commands the TPIM 19 out of torque mode and the HCP 5 further commands switching of the IGBTs 404, 406, 408, 410, 412, and 414 to dissipated energy through the electric machine 56 and in proportion to a magnitude of current circulated through the stators (not shown) of the electric machine 56 while current is applied with zero slip (that is, at the same frequency as motor rotation) with the phase of the current alternating at 180 degrees. The TPIM 19 further commands switching of IGBTs such that energy is dissipated through the electric machine 72 in a substantially similar manner as described for the electric machine 56.

The current is directed such that the stator magnetic axis (not shown) of each stator stays aligned with a magnetic axis of each the rotor (not shown). In an exemplary embodiment, the current is circulated through each stator in an additive alignment with each rotor. In an alternative exemplary embodiment, the current is circulated through each stator in an opposed alignment with each rotor. When discharge across the first power inverter circuit 402 is commanded, the capacitive circuit 430 remains in electrical communication with the active circuit 429. The TPIM 19 measures a voltage across the capacitive circuit 429 after a selected time period elapses and the HCP 5 receives the voltage measurement and determines whether the voltage is below a threshold voltage. When the voltage is below the threshold voltage, the HCP 5 proceeds to end step 330.

Figure 6:
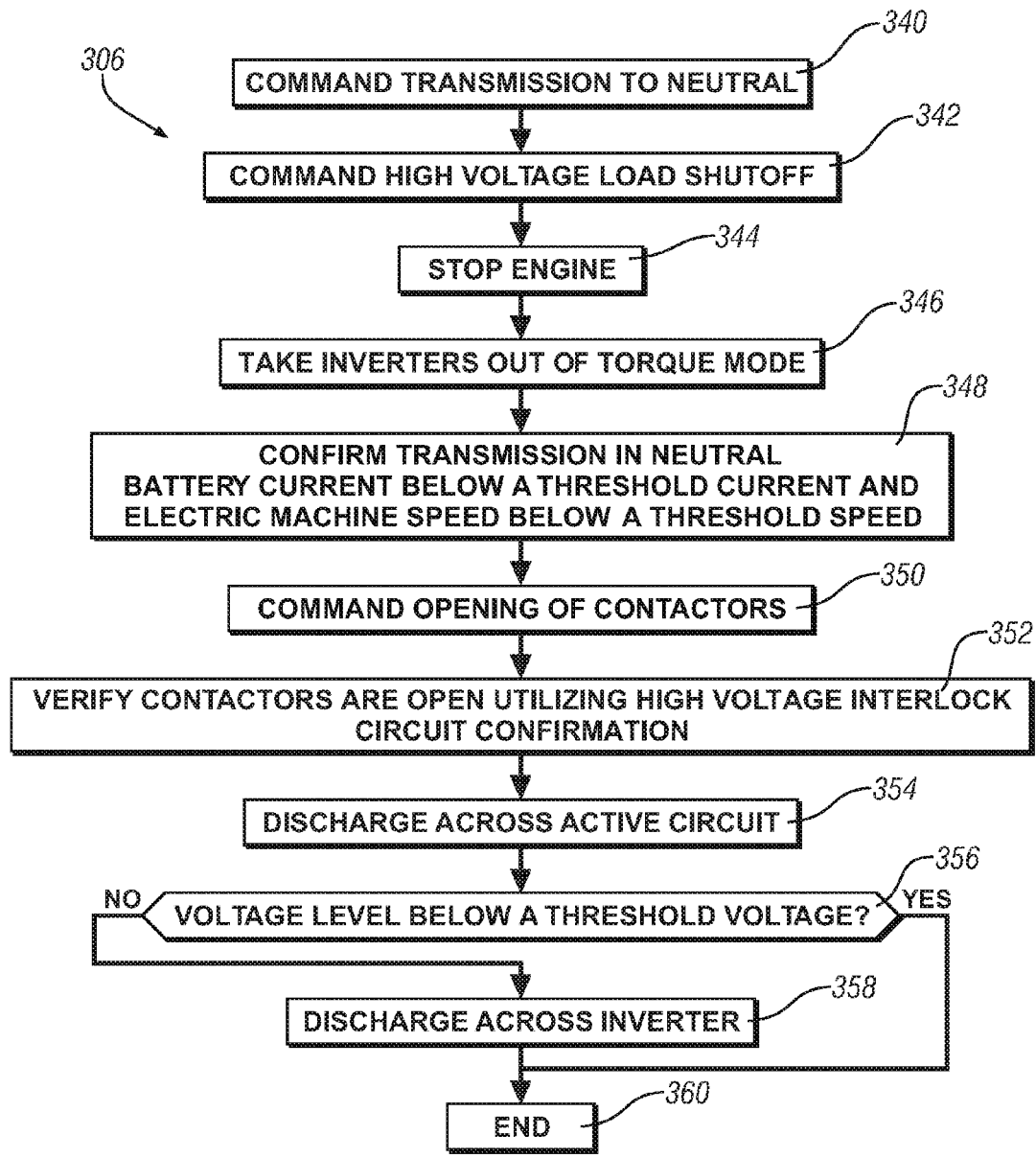
FIG. 6 is a flow charge of an exemplary controlled shutdown procedure, in accordance with the present disclosure.

FIG. 6 shows the second high voltage management strategy 306, when the fault-initiated shutdown event is detected. The HCP 5 commands the transmission 10 to neutral (340), commands auxiliary high voltage load shutoff, commands engine shutoff (344), and command the inverters out of torque mode (346) utilizing a substantially similar process as described for the step 310, the step 312, and the step 314, respectively of first high voltage management strategy 304. The HCP 5 confirms that the transmission 10 is in neutral, the high voltage battery current is below a threshold current level, and that the first and second electric machines 56 and 72 are each below a threshold speed (348). The HCP 5 confirms the transmission 10 is in neutral, confirms the high voltage battery 432 is below a threshold current, and the first and second electric machines 56 and 72 are each below a threshold speed utilizing a substantially similar process as described for step 320 for the first high voltage management strategy 304.

The HCP 5 commands the contactors open (350) utilizing a substantially similar procedure to step 320 of the first high voltage management strategy 304. The HCP 5 verifies the contactors 38 are open utilizing high voltage interlock hardware line 460 (352) utilizing a substantially similar procedure to step 326 of the first high voltage management strategy 304. The HCP 5 discharges the capacitive circuit 429 across the active circuit 463 (352) utilizing a substantially similar procedure to step 322 of the first high voltage management strategy 304. The HCP 5 measures a voltage of the capacitive circuit 429 after a selected time period, and proceeds to either step 358 or to step 360 after the selected time period based on whether voltage measurement of the capacitive circuit 430 after the selected time period is greater than a threshold voltage (356) utilizing a substantially similar process to step 330 of the first high voltage management strategy 304. The HCP 5 discharges across the capacitive circuit 430 of the first power inverter circuit 402 utilizing a substantially similar procedure to step 332 of the first high voltage management strategy 304.

Figure 7:
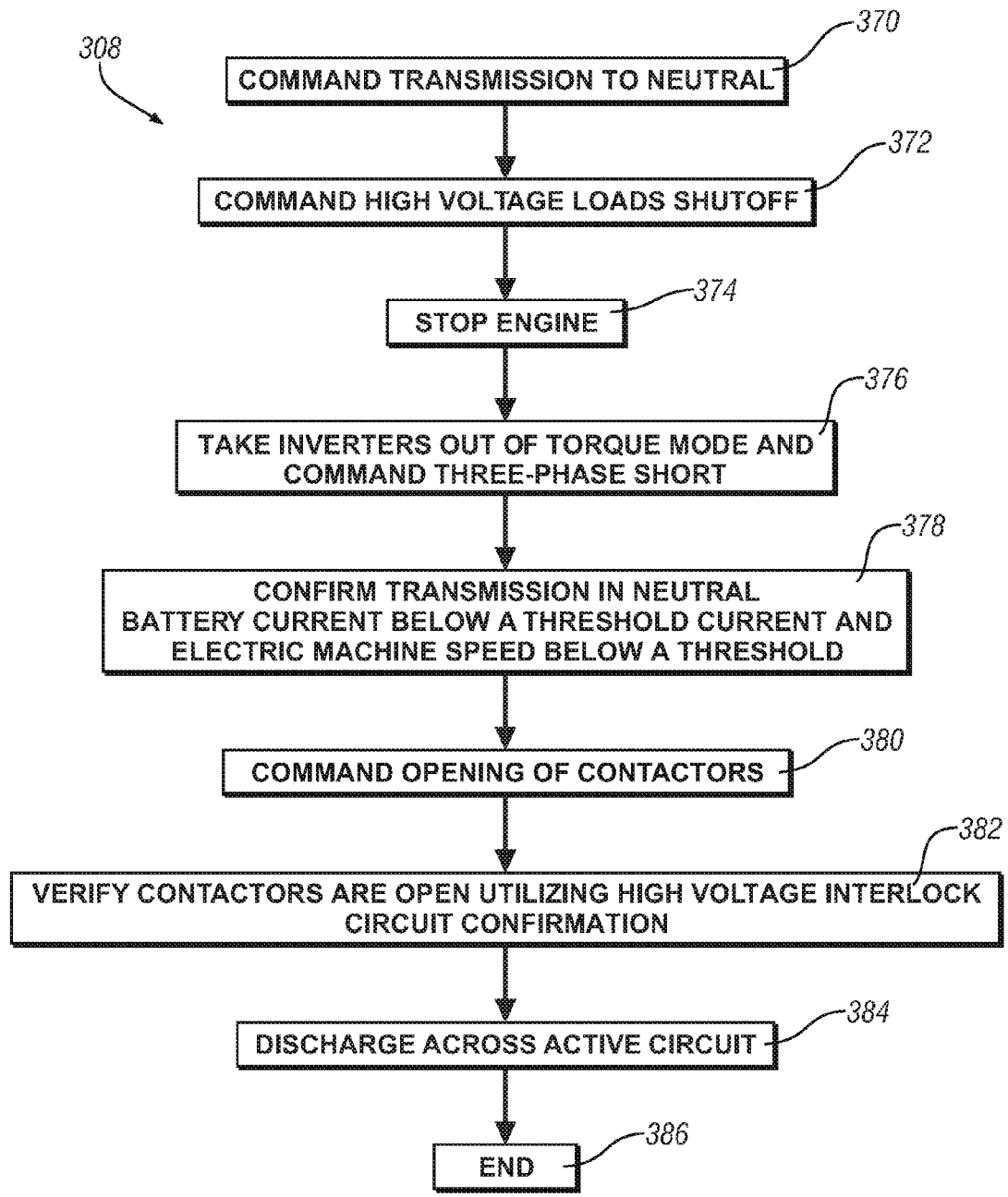
FIG. 7 is a flow charge of an exemplary rapid shutdown procedure, in accordance with the present disclosure.

FIG. 7 shows the third high voltage management strategy 308, when the externally-initiated shutdown event is detected. The HCP 5 commands the transmission 10 to neutral (370), utilizing a substantially similar process as described for step 310 of the first high voltage management strategy 304. The HCP 5 commands auxiliary high voltage loads to shutoff (372) utilizing a substantially similar process as described for step 312 for the first high voltage management strategy 310. The HCP 5 commands fuel injectors (not shown) to discontinue fueling the engine 14 (374). The HCP 5 commands the TPIM 19 to operate in a three-phase short mode. The three-phase short mode is a mode in which the IGBT 406, the IGBT 410, and the IGBT 414 are each switched to a continuously open position and IGBT 404, IGBT 408, and IGBT 412 are each switched in a constant closed position. When the TPIM 19 operates in the three-phase short mode, electrical energy produced by the electric machine 56 is routed through an electrical flow path 475. The electrical flow path 475 flows through the TPIM 19 and the first electric machine 56, but the electric flow path 475 does not flow through to the ESD 74. The TPIM 19 further commands switching of IGBTs (not shown) such that an electrical flow path (not shown) flows through the TPIM 19 and the second electric machine 72, but the flow path does not flow through the ESD 74.

In an alternative embodiment, the HCP 5 can command the TPIM 19 to a three-phase open mode. The three-phase open mode is a mode in which the IGBT 404, the IGBT 410, and the IGBT 414 are each switched to a continuously open position and the IGBT 406, the IGBT 410, and the IGBT 414 are each switched to a continuously closed position. When the TPIM 19 operates in the three-phase open mode, electrical energy produced by the electric machine 56 is routed through an electrical flow path (not shown) such energy produced by the electric machine 56 flows through the TPIM 19 and the first electric machine 56, but not through to the ESD 74. Further, the HCP 5 receives a signal from the TPIM 19 indicating that the TPIM 19 is operating in the three-phase short mode. The HCP 5 confirms that the transmission 10 is in neutral, the battery current is below a threshold current, and that the electric machine speed is below a threshold speed (362) utilizing a substantially similar procedure as described for step 320 of the first high voltage management strategy 304. In an exemplary embodiment of the third high voltage management strategy 308, the HCP 5 confirms that the high voltage battery 432 is below a threshold current of 300 amperes and that the first and second electrical machines 56 and 72 are below a threshold speeds of 8,000 rpm.

The HCP 5 commands the contactors open (380) utilizing a substantially similar procedure to step 320 of the first high voltage management strategy 304. The HCP 5 verifies the contactors 38 are open utilizing high voltage interlock hardware line 460 (382) utilizing a substantial similar procedure to step 326 of the first high voltage management strategy 304. The HCP 5 commands the TPIM 19 to actuate the switch 436 from an open position, to a closed position to electrically couple the active circuit 432 to the capacitive circuit 429 (384) such that power from the capacitive circuit 429 can be dissipated through the resistor 434 of the active circuit 432.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. A method for operating a powertrain comprising an electro-mechanical transmission operative to transmit torque between an input member and an electric machine and an output member to transmit tractive torque, the electric machine electrically connected to an inverter device electrically connected to an energy storage device, a microprocessor performs the following steps:
   detecting a shutdown event of the powertrain wherein the powertrain is commanded to operate in a non-propulsion, energy conservation operating state, wherein detecting the shutdown event of the powertrain comprises detecting one of an operator-initiated shutdown event, a fault-initiated shutdown event and an externally-initiated shutdown event, wherein detecting the externally-initiated shutdown event comprises determining a vehicle roll level greater than a threshold vehicle roll level; detecting deployment of an vehicle airbag; and
   detecting a change in vehicle inertia greater than a threshold inertia level;
   implementing a high voltage strategy in response to the detected shutdown event of the powertrain for isolating the energy storage device from the electric machine, comprising
      commanding the transmission to neutral,
      commanding the electric machine to cease operating in a torque generating mode, and
      electrically disconnecting the energy storage device from the inverter device.

2. The method of claim 1, further comprising commanding switching of transistors of the inverter device to isolate electric current generated by the electric machine from the energy storage device prior to electrically disconnecting the energy storage device from the inverter device when the externally-initiated shutdown event is detected.

3. The method of claim 2, wherein the energy storage device is electrically disconnected from the inverter device a calibrated elapsed period of time after isolating the electric current generated by the electric machine from the energy storage device.

4. The method of claim 2, comprising commanding each of the transistors of the inverter device to a continuously open position to isolate electric current generated by the electric machine from the energy storage device.

5. The method of claim 1, wherein detecting the operator-initiated shutdown event of the powertrain comprises detecting an operator-commanded powertrain shutdown.

6. The method of claim 1, further comprising:
   monitoring a current level of the energy storage device; and waiting a predetermined time period and then electrically disconnecting the energy storage device from the inverter device when the current level is not less than a threshold current level.

7. The method of claim 1, further comprising:
monitoring a rotational speed level of the electric machine; and
waiting a selected time period before electrically disconnecting the energy storage device from the inverter device when the speed level of the electric machine is not below a threshold electric machine speed.

8. A method for operating a powertrain comprising an electro-mechanical transmission operative to transmit torque between an input member and an electric machine and an output member to transmit tractive torque, the electric machine electrically connected to an inverter device electrically connected to an energy storage device, a microprocessor performs the following steps:
detecting a shutdown event comprising detecting one of an operator-initiated shutdown event, a fault-initiated shutdown event and an externally-initiated shutdown event;
commanding the transmission to neutral;
commanding the electric machine to cease operating in a torque generating mode; and
electrically disconnecting the energy storage device from the inverter device;
wherein detecting the fault-initiated shutdown event comprises:
monitoring temperatures of the inverter and the electric machine and determining the temperature of one of the inverter and the electric machine is above a threshold temperature;
monitoring a voltage level of the energy storage device and determining the voltage level of the energy storage device is outside a predetermined voltage range; and
monitoring a current flow between the electric machine and the inverter device and determining the current flow is outside a predetermined current range.

9. A method for operating a powertrain comprising an electro-mechanical transmission operative to transmit torque between an input member and an electric machine and an output member to transmit tractive torque, the electric machine electrically connected to an inverter device electrically connected to an energy storage device, a microprocessor performs the following steps:
detecting a shutdown event comprising detecting one of an operator-initiated shutdown event, a fault-initiated shutdown event and an externally-initiated shutdown event;
commanding the transmission to neutral;
commanding the electric machine to cease operating in a torque generating mode; and
electrically disconnecting the energy storage device from the inverter device;
wherein detecting the externally-initiated shutdown event further comprises:
determining a vehicle roll level greater than a threshold vehicle roll level;
detecting deployment of a vehicle airbag; and
detecting a change in vehicle inertia greater than a threshold inertia level.

10. A method for operating a powertrain comprising an electro-mechanical transmission operative to transmit torque between an input member and an electric machine and an output member to transmit tractive torque, the electric machine electrically connected to an inverter device electrically connected to an energy storage device, a microprocessor performs the following steps:
detecting a shutdown event comprising detecting one of an operator-initiated shutdown event, a fault-initiated shutdown event and an externally-initiated shutdown event;
commanding the transmission to neutral;
commanding the electric machine to cease operating in a torque generating mode;
electrically disconnecting the energy storage device from the inverter device;
monitoring a current level of the energy storage device; and
waiting a predetermined time period and then electrically disconnecting the energy storage device from the inverter device when the current level is not less than a threshold current level, wherein the threshold current level comprises a first current level for the operator-initiated shutdown event and a second current level, greater than the first current level, for the externally-initiated shutdown event.

11. A method for operating a powertrain comprising an electro-mechanical transmission operative to transmit torque between an input member and an electric machine and an output member to transmit tractive torque, the electric machine electrically connected to an inverter device electrically connected to an energy storage device, a microprocessor performs the following steps:
detecting a shutdown event comprising detecting one of an operator-initiated shutdown event, a fault-initiated shutdown event and an externally-initiated shutdown event;
commanding the transmission to neutral;
commanding the electric machine to cease operating in a torque generating mode; and
electrically disconnecting the energy storage device from the inverter device;
monitoring a rotational speed level of the electric machine; and
waiting a selected time period before electrically disconnecting the energy storage device from the inverter device when the speed level of the electric machine is not below a threshold electric machine speed, wherein the threshold electric machine speed comprises a first speed level for the operator-initiated shutdown event and a second speed level, greater than the first speed level, for the externally-initiated shutdown event.

12. A method for operating a powertrain comprising an electro-mechanical transmission operative to transmit torque between an input member and an electric machine and an output member to transmit tractive torque, the electric machine electrically connected to an inverter device electrically connected to an energy storage device, a microprocessor performs the following steps:
detecting a shutdown event comprising detecting one of an operator-initiated shutdown event, a fault-initiated shutdown wherein detecting the externally-initiated shutdown event comprises determining a vehicle roll level greater than a threshold vehicle roll level; detecting deployment of an vehicle airbag; and detecting a change in vehicle inertia greater than a threshold inertia level;
commanding the transmission to neutral;
commanding the electric machine to cease operating in a torque generating mode;
electrically disconnecting the energy storage device from the inverter device; and
opening a contactor switch between the inverter device and the energy storage device to electrically disconnect the energy storage device from the inverter device, wherein opening of the contactor switch occurs after a first time period when the operator-initiated shutdown event is detected and after a second time period when the externally-initiated shutdown event is detected; wherein the first time period is shorter than the second time period and wherein opening the contactor switch occurs after a third time period when the fault-initiated shutdown event is detected, wherein said third time period is intermediate the first and second time periods.

13. A method for operating a powertrain comprising an electro-mechanical transmission operative to transmit torque between an input member and an electric machine and an output member to transmit tractive torque, the electric machine electrically connected to an inverter device electrically connected to an energy storage device, a microprocessor performs the following steps:
   detecting a shutdown event;
   commanding the transmission to neutral;
   commanding the electric machine to cease operating in a torque generating mode;
   electrically disconnecting the energy storage device from the inverter device; and
   commanding a shutoff of a high voltage load.

14. A method for operating a powertrain comprising an electro-mechanical transmission operatively connected to an engine and an electric machine to transmit tractive torque to an output shaft, the electric machine electrically connected to an inverter device electrically connected to an energy storage device, a microprocessor performs the following steps:
   detecting a shutdown event of the powertrain comprising one of an operator-initiated shutdown event, a fault-initiated shutdown event and an externally-initiated shutdown event, wherein the powertrain is commanded to operate in a non-propulsion, energy conservation operating state;
   implementing a first high voltage management strategy when the operator-initiated shutdown event is detected,
   implementing a second high voltage management strategy when the fault-initiated shutdown event is detected, and
   implementing a third high voltage management strategy when the externally-initiated shutdown event is detected.

15. The method of claim 14, wherein detecting the fault-initiated shutdown event comprises:
   determining a temperature of one of the inverter and the electric machine exceeds a threshold temperature;
   determining a voltage level of the energy storage device is outside a predetermined voltage range; and
   determining an electrical current level between the electric machine and the inverter device is outside a predetermined current range.

16. The method of claim 14, wherein detecting the externally-initiated shutdown event further comprises:
   determining a vehicle roll level greater than a threshold vehicle roll level;
   detecting deployment of an vehicle airbag; and
   detecting a change in vehicle inertia greater than a threshold inertia level.

17. A method for managing power in an electric circuit of a hybrid transmission, the electric circuit including a capacitive circuit electrically connected to an inverter circuit and selectively electrically connected to an energy storage device and to an active discharge circuit; said inverter circuit electrically connected to an electric machine, the transmission operative to transmit torque between an input member and the electric machine and an output member, a microprocessor performs the following steps:
   providing the capacitive circuit electrically connected to the inverter circuit and electrically disconnected from the active discharge circuit;
   detecting a shutdown event of the powertrain wherein the powertrain is commanded to operate in a non-propulsion, energy conservation operating state;
   implementing a high voltage strategy in response to the detected shutdown event of the powertrain for isolating the energy storage device from the electric machine, comprising
   commanding the transmission to neutral,
   electrically connecting the active discharge circuit to the capacitive circuit,
   measuring voltage across the capacitive circuit, and
   routing electrical current from the capacitive circuit through the inverter circuit to the electric machine when the voltage across the capacitive circuit exceed the threshold voltage after a predetermined time period subsequent to detecting the shutdown event.

* * * * *